United States Patent [19]
Tao et al.

[11] Patent Number: 5,601,034
[45] Date of Patent: Feb. 11, 1997

[54] ROLLING STOCK AND METHOD FOR EQUIPPING THE INTERIOR THE SAME

[75] Inventors: Takashi Tao; Yasuo Ishimaru; Morishige Hattori; Keiji Ohmura; Hideshi Ohba, all of Kudamatsu, Japan

[73] Assignee: Hitachi, Ltd., Tokyo, Japan

[21] Appl. No.: 309,417

[22] Filed: Sep. 20, 1994

[30] Foreign Application Priority Data

Sep. 20, 1993 [JP] Japan .................................. 5-232807

[51] Int. Cl.⁶ ............................................... B61D 17/00
[52] U.S. Cl. ........................................ 105/423; 105/397
[58] Field of Search ................................. 105/329.1, 331, 105/332, 334, 335, 337, 338, 396, 397, 401, 409, 423; 52/17, 45, 46, 47–56, 220.6, 220.1; 244/118.5, 119, 131; 296/210

[56] References Cited

U.S. PATENT DOCUMENTS

| | | | |
|---|---|---|---|
| 2,882,836 | 4/1959 | Dean | 105/401 |
| 2,925,050 | 2/1960 | Candlin et al. | 105/401 |
| 4,671,033 | 6/1987 | Smith | 52/220.6 |
| 4,799,631 | 1/1989 | Humphries et al. | 105/397 |
| 4,947,762 | 8/1990 | Perzl et al. | 105/329.1 |

FOREIGN PATENT DOCUMENTS

| | | | |
|---|---|---|---|
| 579500 | 1/1994 | European Pat. Off. | 105/397 |
| 136596 | 7/1979 | Germany | 105/397 |
| 284162 | 11/1990 | Germany | 105/397 |
| 680076 | 3/1994 | Japan | 105/401 |

*Primary Examiner*—Mark T. Le
*Attorney, Agent, or Firm*—Antonelli, Terry, Stout & Kraus, LLP

[57] ABSTRACT

A rolling stock fitting structure has laminated panels, each formed by sandwiching a core member between a pair of face plates, and channel members are placed between the face plates around the periphery of the panels and possibly in the interior thereof to provide structural strength. The laminated panels, which may be shaped to conform to a particular design, are joined and welded together to form a rolling stock body. The channels are provided with holding members for holding equipment, so that the load of the equipment on the holding member can be distributed through the channel member to the laminated panel, thereby securing the equipment reliably.

9 Claims, 12 Drawing Sheets

ROLLING STOCK AND METHOD FOR EQUIPPING THE INTERIOR THE SAME

BACKGROUND OF THE INVENTION

The present invention relates to rolling stock and a method for equipping the interior of the same; more particularly, the invention relates to a rolling stock equipping structure suitable for equipping rolling stock with miscellaneous equipment, including thermal insulating fixtures and interior finishing Parts.

The reduction in weight of the body structure of rolling stock for reducing noise or power consumption has become more important with the progressive enhancement of the traveling speed of railway trains. The body structure of rolling stock is exposed to high positive and negative pressures varying in a wide range due to variation of the external pressure while the rolling stock is running through a tunnel at a high traveling speed of 200 km/hr or above. Therefore, the body structure of the rolling stock must have an improved pressure resistance, as well as a sufficiently high shearing rigidity and a sufficiently high bending rigidity. A body structure proposed to meet such requirements, as proposed, for example, in Japanese Patent Laid-open (Kokai) No. 3-90468, employs aluminum honeycomb panels constructed by joining the component parts by brazing.

When attaching equipment to the interior structure of conventional rolling stock provided with equipment and screw seats welded thereto, the equipment is positioned in place by gauging, and then threaded holes are formed in which screws are inserted.

Since each piece of equipment requires positioning by gauging, much time and labor is required to fit out the rolling stock. Another structure, as proposed, for example, in Japanese Utility Model Publication (Kokoku) No. 60-9096, is provided with equipment rails on its ceiling structure, and pieces of interior equipment, particularly, ceiling equipment, are assembled in a unit, the unit of interior equipment then being fitted on or attached with screws to the equipment rails.

The face plates of the aluminum honeycomb panels employed by the known equipment structure are comparatively thin aluminum alloy plates so that the aluminum honeycomb panels have a lightweight construction. Therefore, it is inappropriate, from the viewpoint of maintaining a holding rigidity, to attach equipment directly to the aluminum honeycomb panels with screws. Furthermore, welding the screw seats, which usually are thin plates, or the like, to the face plates of the aluminum honeycomb panel requires advanced techniques and very difficult work to secure reliability in the installation.

Although the arrangement of the equipment rails of the latter known equipping structure, for holding units of interior equipment is not described in detail, presumably, the equipment rails are welded to the frame members of the equipping structure. Accordingly, the application of this equipping structure to the body structure of rolling stock employing the aforesaid panels still provides many problems to be solved with respect to the strength of the equipping rail setting arrangement and the reliability of the installation.

SUMMARY OF THE INVENTION

Accordingly, it is an object of the present invention to provide rolling stock and a method for equipping the interior of the same, having a body structure comprising laminated panels, capable of securing equipment in such a way as to maintain rigidity and reliability in the installation of the equipment.

With the foregoing object in view, the present invention provides a rolling stock fitting structure comprising laminated panels, each formed by sandwiching a core member between a pair of face plates, placing channel members between the pair of face plates so as to surround the core member, and joining the shapes to the pair of face plates, the laminated panels being arranged contiguously and being connected by welding together the adjacent shapes, characterized in that the channel members are provided with holding members for holding equipment, and in that equipment is fixedly held on the holding members.

Since the holding members are formed integrally with the channel member of the laminated panel, the load of the equipment held on the holding member can be distributed through the channel member to part of the laminated panel around the channel member; and, consequently, local stress concentration can be obviated, and the equipment can be securely held on the holding member and the reliability of the equipping structure can be secured.

BRIEF DESCRIPTION OF THE DRAWINGS

FIG. 6 is a fragmentary sectional view of part of the wainscot and part of the floor of the body structure of FIG. 1.

FIG. 7 is a sectional view of a fixture holding member employed in a rolling stock equipping structure according to the present invention.

DETAILED DESCRIPTION OF PREFERRED EMBODIMENTS

Figure 1:
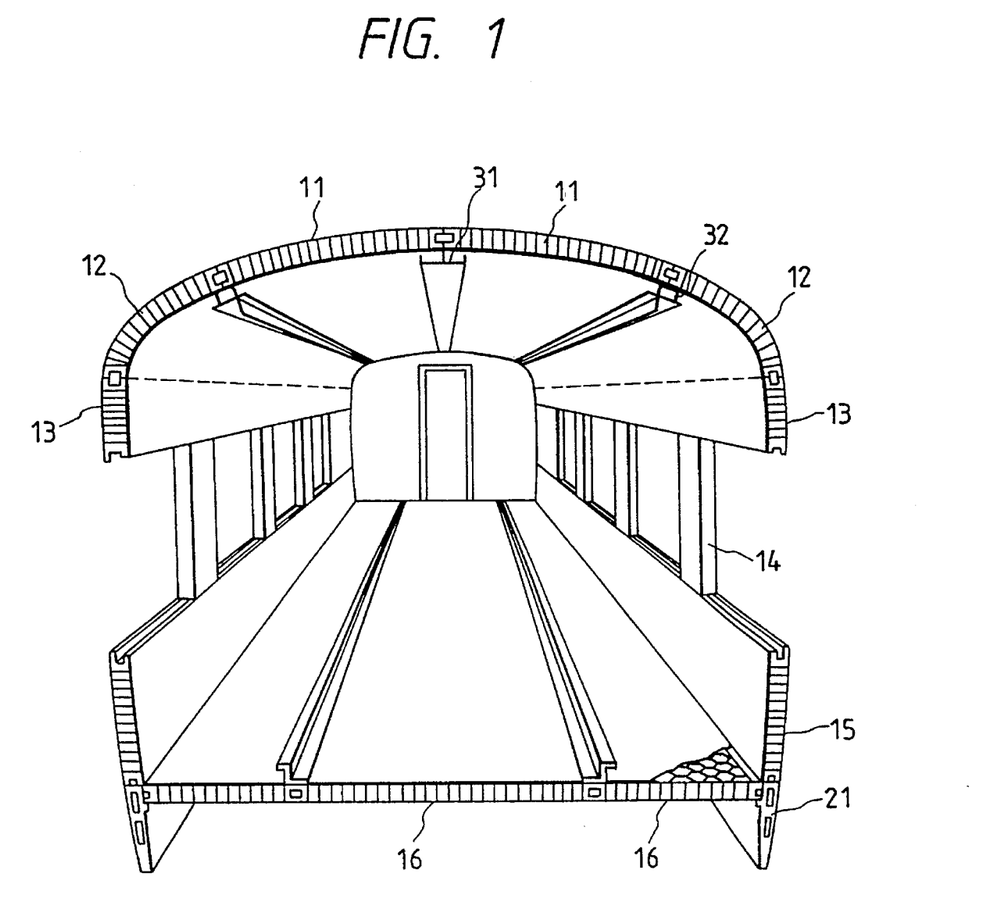
FIG. 1 is a front view of a body structure provided with a rolling stock equipping structure in a first embodiment according to the present invention, in a state before being fit out.
Figure 2:
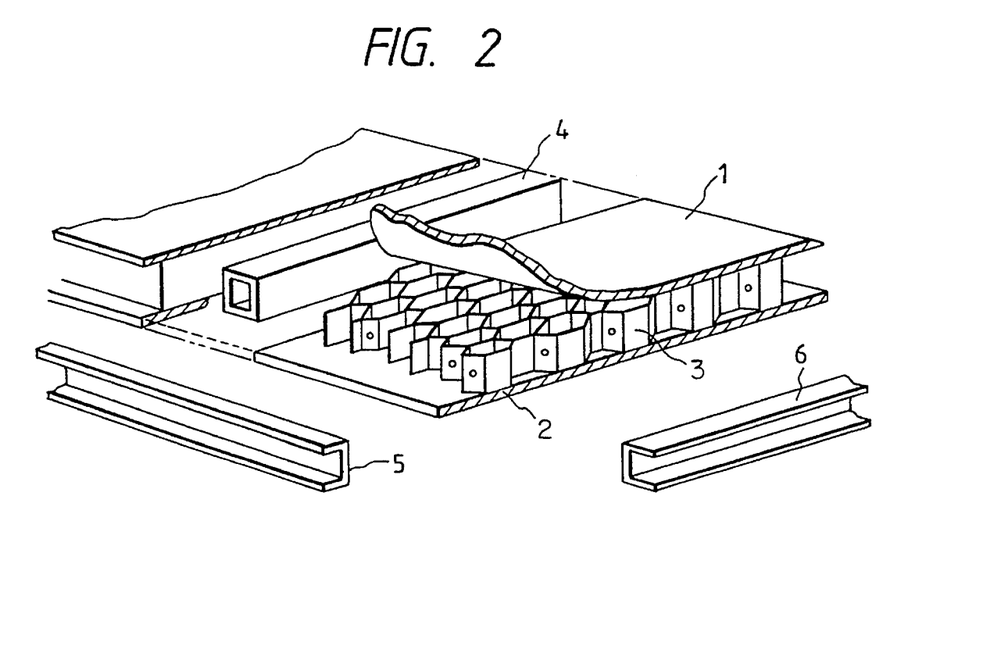
FIG. 2 is a perspective view of a laminated panel for constructing the body structure of rolling stock.

An equipment structure in a preferred embodiment according to the present invention will be described with reference to FIGS. 1 to 6. FIG. 1 is a partly sectional front view of a structure comprising brazed aluminum honeycomb panels, i.e., laminated panels, formed by brazing component parts and each provided with a honeycomb core structure; FIG. 2 is a partly cutaway perspective view of the brazed aluminum honeycomb panel; and FIGS. 3, 4, 5 and 6 are fragmentary sectional views for use in explaining ways of attaching interior equipment to the structure shown in FIG. 1. First, the construction of the brazed aluminum honeycomb panel will be described with reference to FIG. 2. Referring to FIG. 2, a pair of face plates 1 and 2 are thin aluminum alloy plates having a thickness on the order of 1 mm, and a core structure 3 is formed by bending and joining together thin aluminum alloy plates having a thickness on the order of 0.2 mm in a honeycomb construction. The core structure 3 is sandwiched between the face plates 1 and 2 so that the face plates 1 and 2 are spaced apart from each other. Each of the reinforcing members 4, having a rectangular cross section and provided with an inner rib, has opposite, parallel outer surfaces joined respectively to the face plates 1 and 2, and opposite side surfaces in contact with the core structures 2. Framing shapes 5 and 6, i.e., channels, having U-shaped cross section are disposed between the face plates 1 and 2 with their webs in contact with the core structure 3 so as to define the periphery of the laminated panel. The reinforcing members 4 and the channels 5 and 6 are formed by extruding aluminum alloy blanks. The laminated panel is provided with the reinforcing members 4 when the use of the laminated panel requires. When the laminated panel has a curved shape, the reinforcing members 4 and the channels 5 and 6 having appropriate curved shapes are incorporated by brazing into the laminated panel.

The body structure of the rolling stock is formed by assembling the laminated panels; that is, as shown in FIG. 1, the body structure is constructed by butt-welding the adjacent shapes of roof panels 11, eave panels 12, window header panels 13, pier panels 14 and wainscot panels 15, some of which are formed in appropriate curved shapes. An underframe is formed by extending cross beams, not shown, across a pair of side beams 21, extending floor panels 16 between the side beams 21 and joining the side edges of the floor panels 16 to the side beams 21. At the junction of the adjacent panels, the channels at the edges of the panels are joined together by butt-welding the edges of the flanges of the channels so as to form a beam having a rectangular cross section. Central ceiling holding member 31 and side ceiling holding members 32 are welded to or attached with fastening members to the shapes. The central ceiling holding member 31 and the side ceiling holding member 32 are shapes formed of an aluminum alloy by extrusion molding, and are extended longitudinally of the body structure so that the junctions thereof are arranged along the longitudinal direction of the body structure.

Figure 3:
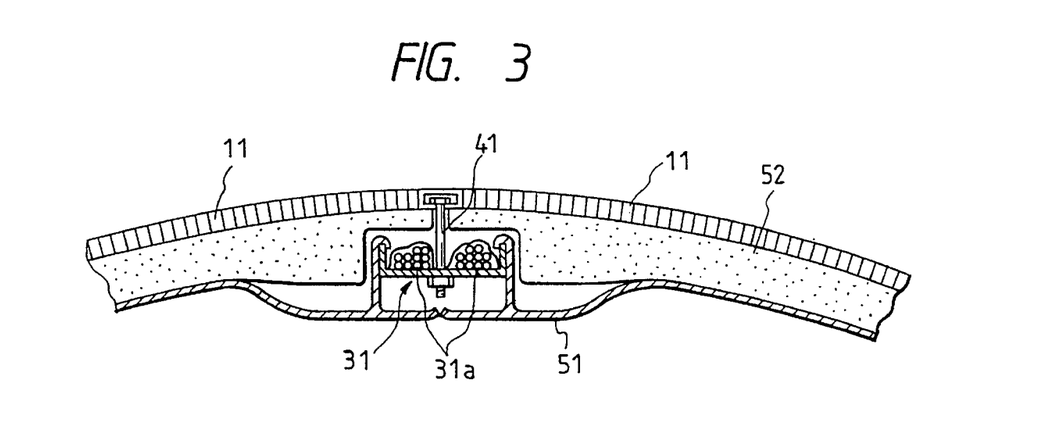
FIG. 3 is a fragmentary sectional view of the roof of the body structure of FIG. 1.

The equipping structure will be described in detail with reference to FIGS. 3 to 6. Referring to FIG. 3 showing part of the ceiling, the central ceiling holding member 31 has a substantially U-shaped cross section and is provided on its web with suspension bolts 41 for suspending the central ceiling holding member 31 from the channels of the roof panels 11. The head of each suspension bolt 41 is inserted through an opening formed in the wall of the beam formed by joining the channels in the beam, and then the suspension bolt 41 is shifted from the opening or turned in the opening, so that the suspension bolt 41 is hung on the beam. The threaded part of the suspension bolt 41 is passed through an opening formed in the web of the central ceiling holding member 31 and a nut is screwed on the threaded end of the suspension bolt 41 to support the central ceiling holding member 31 by the channels of the roof panels 11. The web and the flanges of the central ceiling holding member 31 defines a space for containing bundles of wires for lighting fixtures and cab broadcasting fixtures, and bundles of signal wires for transmitting signals and the central ceiling holding member 31 serves also as a cable duct 31a. A mounting portion of ceiling board 51 is hung or hooked on the edges of the wiring duct 31a. The wires are extended beforehand on the central ceiling holding member 31, i.e., the wiring duct 31a, by outwork, and the central ceiling holding member 31 holding the wires is suspended from the roof panel 11 by the suspension bolts 41.

Thermal insulating panels 52 are extended longitudinally of the body structure in spaces between the central ceiling holding member 41 and side ceiling holding members 32, and are bonded adhesively to the roof panels 11. Preferably, the thermal insulating panels 52 are continuous over the entire length of the body structure.

Figure 4:
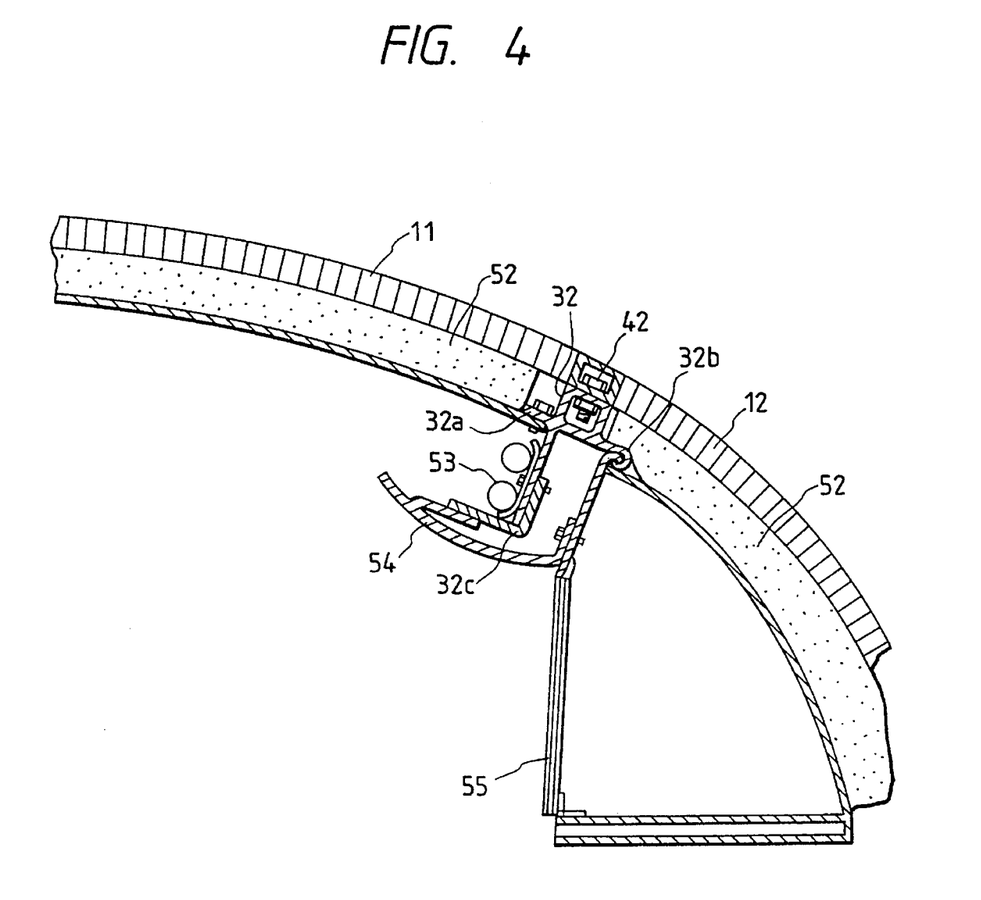
FIG. 4 is a fragmentary sectional view of the eaves of the body structure of FIG. 1.

Referring to FIG. 4, showing part of the eaves, the side ceiling holding member 32 has a cross section resembling the inverted letter L. The side ceiling holding member 32 is fastened, similarly to the central ceiling holding member 31, to the channels extending along the junction of the roof panel 11 and the eaves panel 12 with a fastening bolt 42. The side ceiling holding member 32 has, on one side thereof, a support portion constituted by a flange 32a extending toward the middle of the ceiling, and has, on the other side thereof, a support portion constituted by a hook flange 32b extending away from the middle of the ceiling board 51 and terminating in equipment holding means constituted by a hooked edge. One side edge of the ceiling board 51 is fastened to the flange 32a with screws, and one end of a parcel rack 55, which will be described later, has a mounting portion which is hooked to the hooked edge of the hook flange 32b. The side ceiling holding member 32 further has a bracket flange 32c projecting into the cabin. Lighting fixtures 53 and lamp covers 54 are attached to the bracket flange 32c. The parcel rack 55, having one end hooked to the hook flange 32b, has a rear wall, a bottom wall and a front lid, and the interior of the parcel rack 55 is partitioned into boxes by partition walls at a pitch corresponding to that of the seats. Frame members, not shown, connect the bottom wall of the parcel rack 55 to the upper end of the parcel rack 55 hooked to the hooked edge of the hook flange 32b. The lower end of the parcel rack 55 is fixed to the shapes extending along the junction of the eaves panel 12 and the window header panel 13. The lamp covers 54 are arranged for indirect illumination under the lighting fixtures 53 so as to cover the gap between the lighting fixtures 53 and the parcel rack 55. The outer edges of the lamp covers 54 are fixed to the upper part of the parcel rack 55. A longitudinally continuous thermal insulating panel 52 is put in the space between the parcel rack 55 and the eaves panel 12 and is bonded adhesively to the eaves panel 12.

Figure 5:
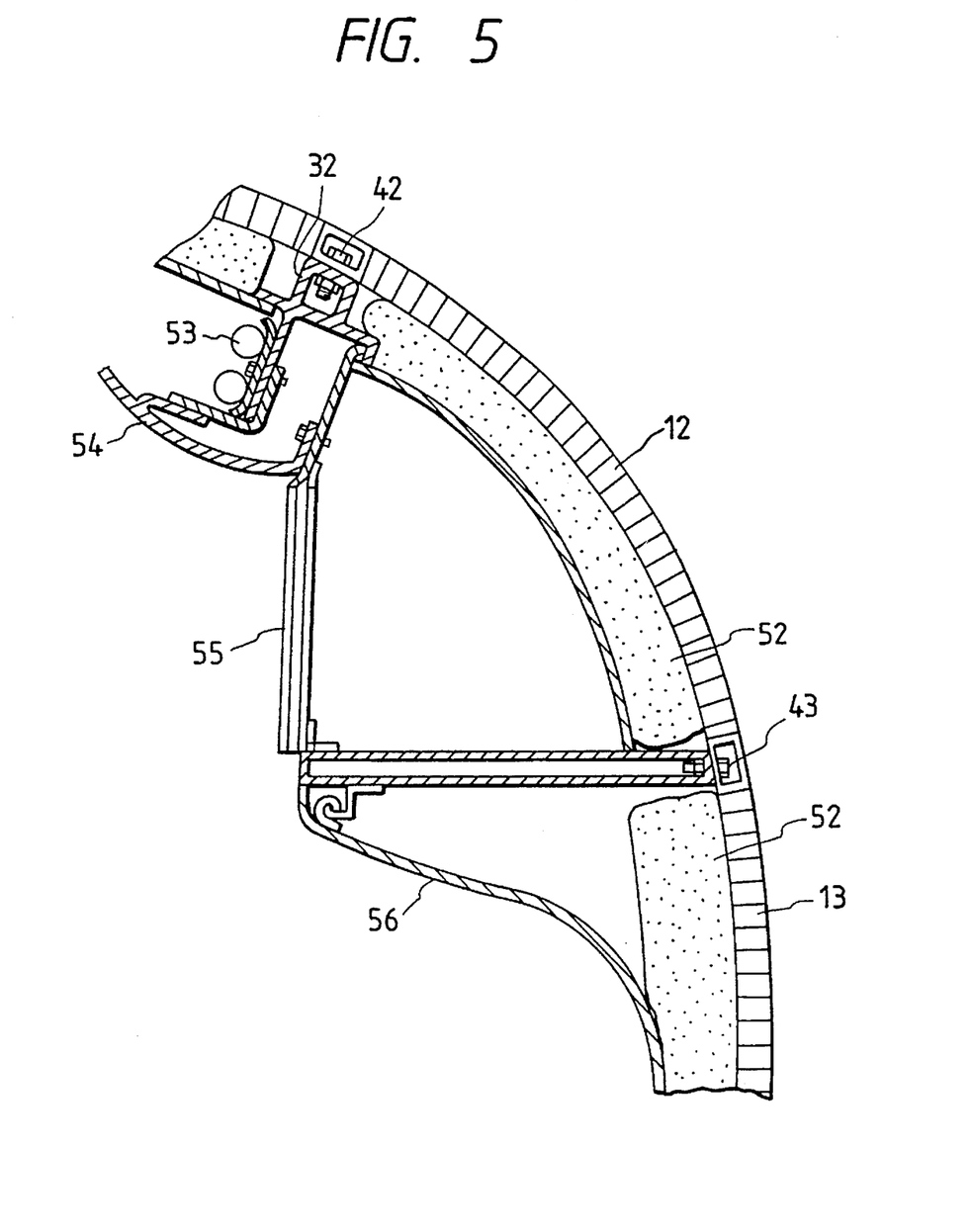
FIG. 5 is a fragmentary sectional view of the window header of the body structure of FIG. 1.

Referring to FIGS. 5 and 6, showing the window header and the wainscot, the parcel rack 55 is fixed to the channels extending along the junction of the eaves panel 12 and the window header panel 13 with fastening bolts 43. Each fastening bolt 43 is held on the channels in a state similar to that in which the suspension bolt 41 is held on the corresponding channels. A side interior face board 56, covering an area under the parcel rack 55, areas around the windows and areas from the lower side of the window to the floor, is provided with hooks on the upper part of the back side thereof, and the hooks are hooked to catches attached to the bottom wall of the parcel rack 55. The lower edge of the side interior face board 56 is fastened to the edge of the floor panel with screws. The side interior face board 56 is provided with framing openings corresponding to the windows. Thus, the side interior face board 56 frames the windows and covers the inner surfaces of the pier panels 14. The spaces between the side interior face board and the window header panels 13, the pier panels 14 and the wainscot panels 15 are packed with thermal insulating panels 52. The thermal insulating panels 52, those placed in the window header and the wainscot excluding those placed in the pier, similarly to those placed in the roof, are longitudinally continuous, and are bonded adhesively to the corresponding panels. Branch ducts 58, which branch from an air supply duct 57 for conveying conditioned air so as to blow conditioned air into the cabin, are arranged in a space between the side interior face board 56 and the thermal insulating panels 52 and under the windows. The branch ducts 58 open into the cabin at positions under the windows to blow conditioned air into the cabin.

The thermal insulating panels 52 are bonded adhesively to the corresponding panels and are pressed against the panels by the ceiling boards 51, the parcel rack 55 and the side interior face board 56. Accordingly, the reactive force of the thermal insulating panels 52 suppresses the vibration of the ceiling boards 51, the parcel rack 55 and the side interior face boards 56.

Floor beams 61 for supporting floor boards 17 are fastened to the channels of the floor panels 16 extending along the junctions of the floor panels 16 with fastening bolts 44. Each floor panel 17 is a glued honeycomb panel formed by sandwiching an aluminum alloy honeycomb core structure between aluminum alloy plates. The air supply duct 57 and a return duct 59 are extended in the space between the floor panels 16 and the floor board 17. The return duct 59 is fastened to the channels of the floor panels 16. The legs 62 of the seats are fixed to the floor board 17.

A procedure for equipping the rolling stock will be described hereinafter. The body structure is constructed by assembling the roof panels 11, the eave panels 12, the window header panels 13, the pier panels 14 and the wainscot panels 15 in blocks, such as roof blocks and side blocks, joining the side blocks to the underframe combined with the floor panels 16, joining the roof blocks to the side blocks, and joining end panels to the side blocks and the roof blocks. After assembling the panels in those blocks or after completing the body structure, openings for receiving the fastening bolts are formed in the channels of the panels extending along the junctions of the panels by an automatic machine tool or the like. Then, the longitudinally continuous thermal insulating panels 52 are attached to the inner surface of the body structure. Then, the central ceiling holding member 31 containing wiring harnesses prepared by outwork is fastened to the channels of the ceiling panels with the suspension bolts 41, and the side ceiling holding members 32 and the floor beams 61 are fastened to the channels of the corresponding panels with the fastening bolts.

Then, after wiring the wires pulled out from the wiring harness, one side edge of each ceiling board 51 is hooked to the central ceiling holding member 31 and the other side edge of the same is fastened to the side ceiling holding member 32. Then, one end of the parcel rack 55 is hooked to the side ceiling holding member 32 and the other end of the same is fastened to the channels of the panels. Subsequently, the upper edges of the side interior face boards 56 are hooked to the lower end of the parcel rack 55 and the lower edges of the same are fastened to the edges of the floor panel 16 previously fastened to the floor beam 61. The air supply duct 57, the branch ducts 58 and the return duct 59 are laid subsequent to the equipping of the thermal insulating panels 52. Then, the lighting fixtures 53 and the lamp covers 54 are attached to the side ceiling holding members 32, and the legs 62 of the seats are fixed to the floor panels 16.

Thus, the ceiling boards 51, the parcel racks 55, the side interior face boards 56 and the fixtures, including the lighting fixtures 53 and the lamp covers 54, are fixed firmly to the channels having a sufficiently high strength and extending along the junctions of the panels with the central ceiling holding member 31, the side ceiling holding members 32 and the fastening bolts 41, 42 and 43, respectively, to provide a high holding reliability. Since the channels extending along the junctions of the adjacent panels are connected to the components of the panels by brazing, the load acting on the channels can be distributed to the panels forming the body structure. Since the adjacent channels of the panels are to be joined together by welding, the web and the flanges of each channel have a predetermined thickness suitable for welding, and hence the strength of the channels is higher than that of the face plates. Accordingly, the fixtures can be securely held by the holding members on the channels by a sufficiently high holding strength to provide an improved holding reliability.

Incidentally, since the body structure constructed by assembling the highly rigid laminated panels and portions of the channel at positions at which the fixture holding members are to be attached to the channels are machined after completing the body structure, the intervals between the fixture holding members can be determined with a high accuracy. Accordingly, the ceiling boards 51, the parcel racks 55 and the side interior face boards 56, each of which is held by a plurality of fixture holding members, can be positioned very simply and efficiently relative to the corresponding fixture holding members; and, therefore, when re-equipping the interior of the rolling stock, assembling work, similar to the first assembling work carried out when fabricating the rolling stock, can be readily carried out, provided that the fixtures are formed accurately.

Since necessary machining work for machining the components of the rolling stock equipping structure is completed when constructing the body structure, the equipping work does not need either boring work or tapping work, any additional work for clearing the body structure of chips is not necessary and faulty machining work can be obviated. Since the inner surface of the body structure formed by the smooth surfaces of the panels are smooth and free from projections, longitudinally continuous thermal insulating panels 52 can be used, which improves the efficiency of the work for laying the thermal insulating panels over the inner surface of the body structure, as compared with the efficiency of the work for individually laying thermal insulating pads in spaces between framing members. Since the thermal insulating panels 52 are longitudinally continuous, the thermal insulating panels 52 provide an improved thermal insulating effect.

Portions of the ceiling board 51 and the side interior face board 56 to be fastened with screws are provided with mounting portions constituted by slots to enable the adjustment of the positions of the boards 51 and 56 with respect to the width, namely, with respect to circumferential directions. Each slot is formed with its length extending along the direction of the width of the body structure or in vertical directions. Since one of the mounting portions of each of the ceiling board 51 and the side interior face board 56 is fixed by hooking, the positions of the ceiling board 51 and the side interior face board 56 with respect to the longitudinal direction of the body structure can be easily adjusted. Even if the distance between the central ceiling holding member 31 and the side ceiling holding member 32 along the longitudinal direction of the body structure somewhat deviates from a correct distance, the ceiling board 51 can be easily attached to the central ceiling holding member 31 and the side ceiling holding member 32 because the ceiling board 51 is provided with slots, and the positions of the face boards on the constructions with respect to the longitudinal direction of the body structure and directions perpendicular to the longitudinal direction of the body structure are adjustable. Accordingly, the equipment can be fitted to the body structure without difficulty, even if the dimensions of the body structure or the constructions are not very accurate, which is particularly effective in renewing work for replacing the equipment with new equipment.

Although the fixture holding members are fastened to the channels extending along the junction of the adjacent panels using a fastening bolt in the first embodiment, the fixture holding members may be attached to the channels by welding or riveting, or the channels may be provided with fixture holding rails, which will be described hereinafter.

Referring to FIG. 7, in which parts similar or corresponding to those shown in FIG. 2 are denoted by the same reference characters, showing a structure formed by welding a fixture holding member to the joint of laminated panels, the channels 5 of adjacent laminated panels are joined together by butt welding and welded parts W are formed. A fixture holding member 71 has a rail-like fixture holding part, and a T-shaped leg to be joined to the channels of the laminated panels. A clearance groove is formed in the upper surface of the T-shaped leg so as to correspond to the bead in the welded part W. The edges of the flange of the T-shaped leg are welded to the channels. The T-shaped heads of special T-bolts are put in the T-slot of the rail-like fixture holding part of the fixture holding member 71 to hold the fixtures.

Since the T-bolts can be moved along the T-slot of the fixture holding member 71, fixtures can be held firmly on the fixture holding member 71 after adjusting the positions of the fixtures by moving the T-bolts along the T-slots of the fixture holding member 71. Thus, the relative positions of the fixtures can be easily adjusted. Since the fixture holding member 71 is welded to the inner surface of the body structure, the body structure need not be machined for boring and the like, the strength of the body structure is not affected by the fixture holding member 71 and no chips will be produced. The fixture holding member 71 is made of an aluminum alloy formed by extrusion. Since the rail-like fixture holding part can be formed in a desired shape, the fixture holding member 71 is the same as the fixture holding structure of the foregoing embodiment in function and effect.

Figure 8:
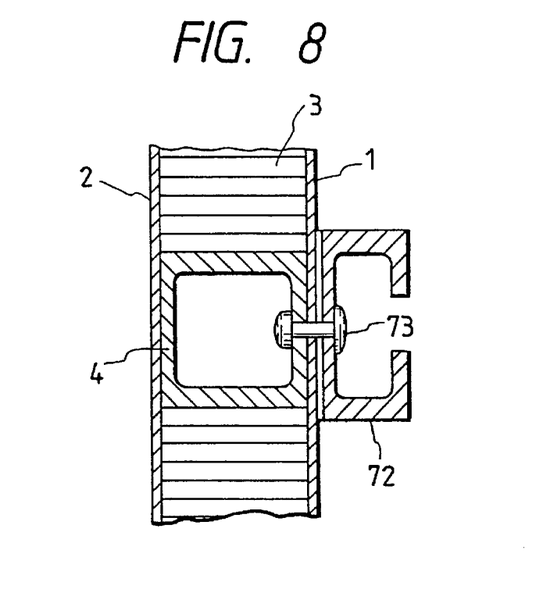
FIG. 8 is a sectional view of a fixture holding member employed in a rolling stock equipping structure according to the present invention.

FIG. 8 is a sectional view of a reinforcing member provided with a fixture holding member, in which parts similar or corresponding to those previously described with reference to FIG. 2 are denoted by the same reference characters. A fixture holding member 72 has a channel having a substantially C-shaped cross section. The fixture holding member 72 is attached to a reinforcing member 4 with rivets 73. The fixture holding member 72, like the fixture holding member 71, has a rail-like shape that facilitates the positional adjustment of fixtures. Since the fixture holding member 72 is attached to the reinforcing member 4 using rivets 73, no stress resulting from localized heating by welding heat input is induced in the reinforcing member 4 and the fixture holding member 72, so that fixtures can be arranged with a high accuracy.

Figure 9:
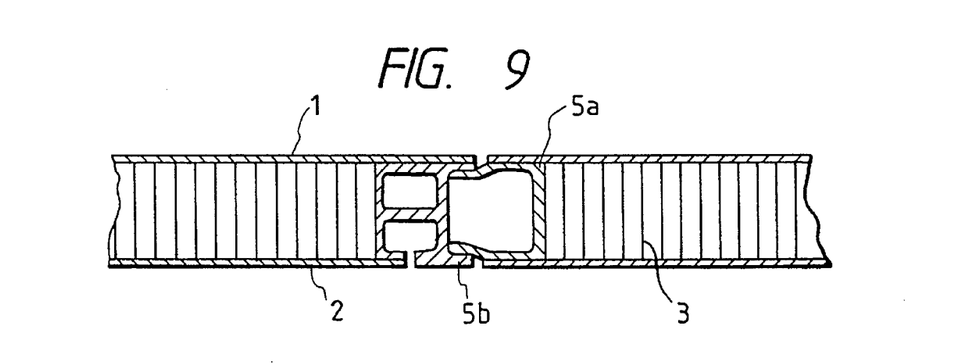
FIG. 9 is a fragmentary sectional view of a laminated panel provided with a framing shape integrally provided with a fixture holding part, employed in a rolling stock equipping structure according to the present invention.

FIG. 9 is a fragmentary sectional view of a laminated panel, and another laminated panel integrally formed with a channel provided with a fixture holding part. Referring to FIG. 9, a channel 5a contiguous with a core structure 3 has a substantially U-shaped cross section similar to that of the channel 5, and the edges of the flanges of the channel 5a are stepped toward each other to form connecting edges. A channel 5b to be joined to the channel 5a has a rectangular cross section and is provided with an inner rib. A slit is formed in one wall of the channel 5b, facing the interior of the cabin to form a rail-like fixture holding part similar to the fixture holding member 72. The channel 5b has connecting flanges projecting toward the channel 5a. The adjacent laminated panels are provided with the channel 5a and the channel 5b, respectively. When joining the adjacent laminated panels together, the connecting edges of the channel 5a is inserted in the space between the connecting flanges of the channel 5b, and the channels 5a and 5b are welded together along their junction.

When a body structure is constructed by joining such laminated panels together by welding, the fixture holding parts of the channels 5b are exposed on the inner surface of the body structure. Therefore, any special work for attaching fixture holding members to the channels is unnecessary.

Since connecting means including fastening bolts, welding and riveting are unnecessary, the deterioration of the fixture holding reliability attributable to unfavorable working condition and faulty work of unskilled operatives can be obviated.

Figure 10:
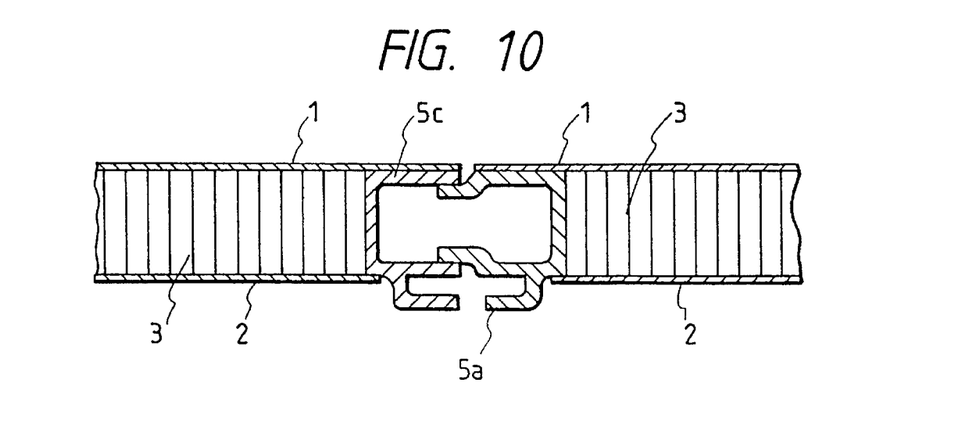
FIG. 10 is a fragmentary sectional view of laminated panels provided respectively with framing shapes forming a fixture holding part in combination, employed in a rolling stock equipping structure according to the present invention.

FIG. 10 is a fragmentary sectional view of laminated panels provided respectively with channels, which form a fixture holding part in combination. Referring to FIG. 10, one of the adjacent laminated panels is provided with a channel 5c, and the other laminated panel is provided with a channel 5d. When joined together, the channels 5c and 5d form a rail-like fixture holding part in combination. When joining the channels 5c and 5d together, the stepped connecting edge of the flanges of the channel 5c are inserted in a space between the flanges of the channel 5d, and the framing shapes 5c and 5d are welded together along their junction. Thus, the fixture holding part can be formed simply by joining the laminated panels together by welding, which simplifies the work.

Figure 11:
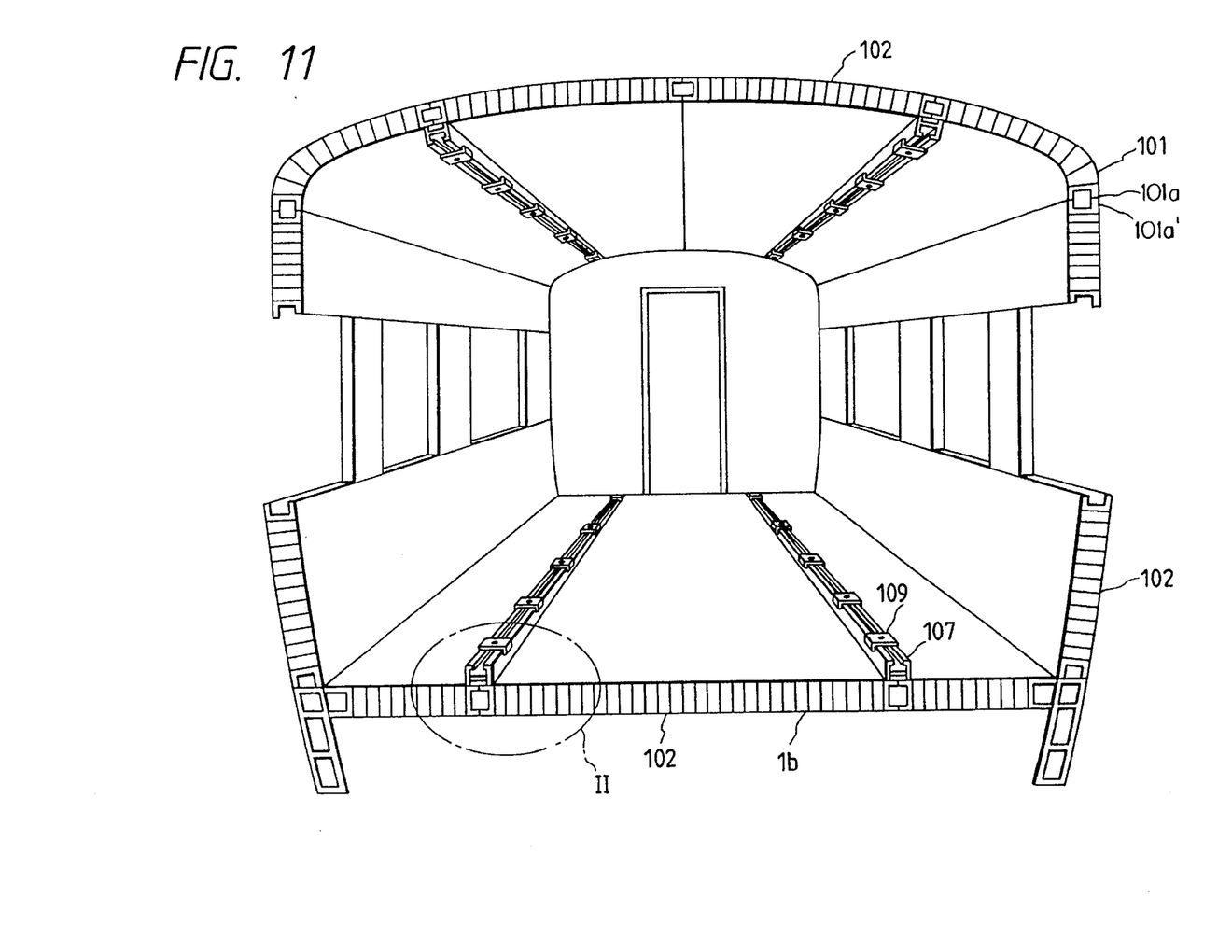
FIG. 11 is a cross-sectional view of rolling stock provided with a rolling stock equipping structure in a further embodiment according to the present invention.
Figure 12:
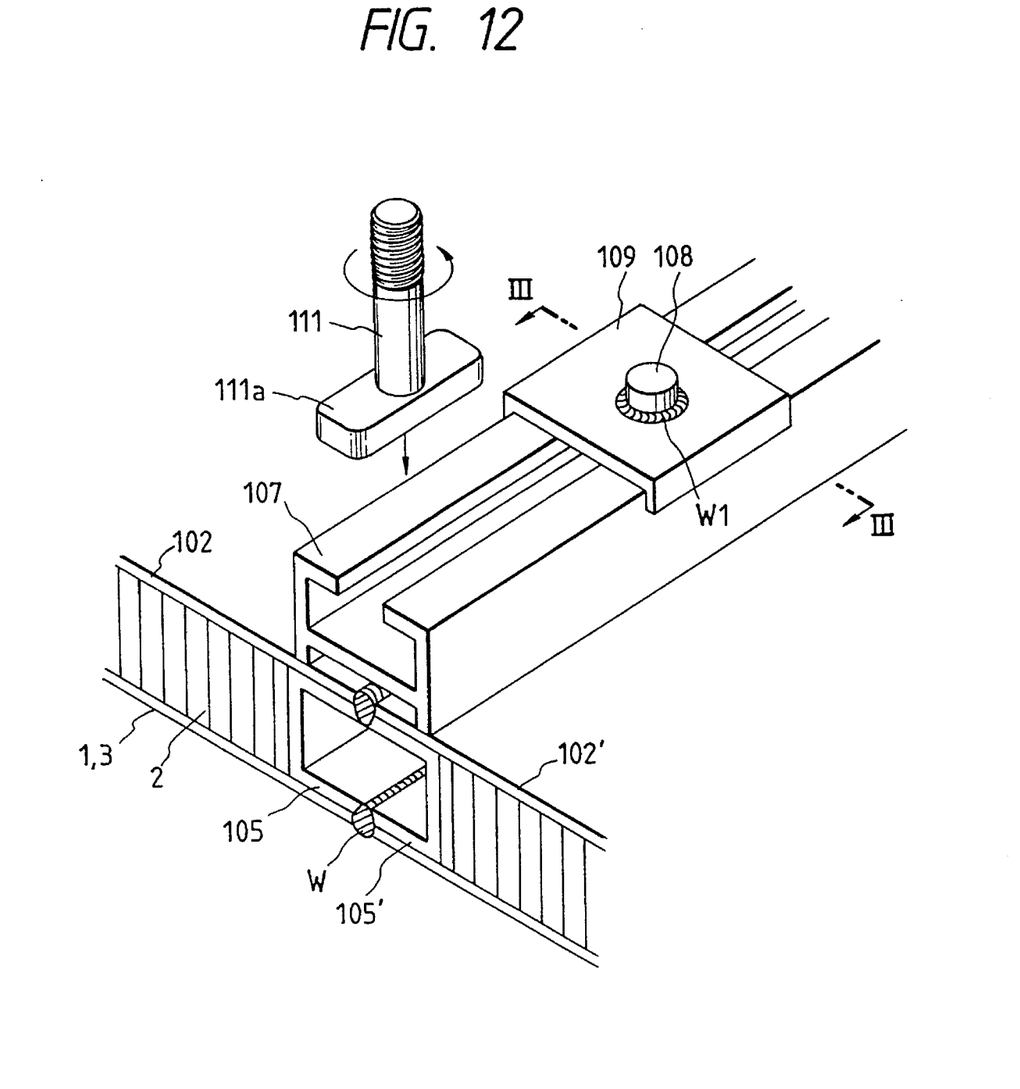
FIG. 12 is an enlarged perspective view of a portion II of FIG. 11.
Figure 13:
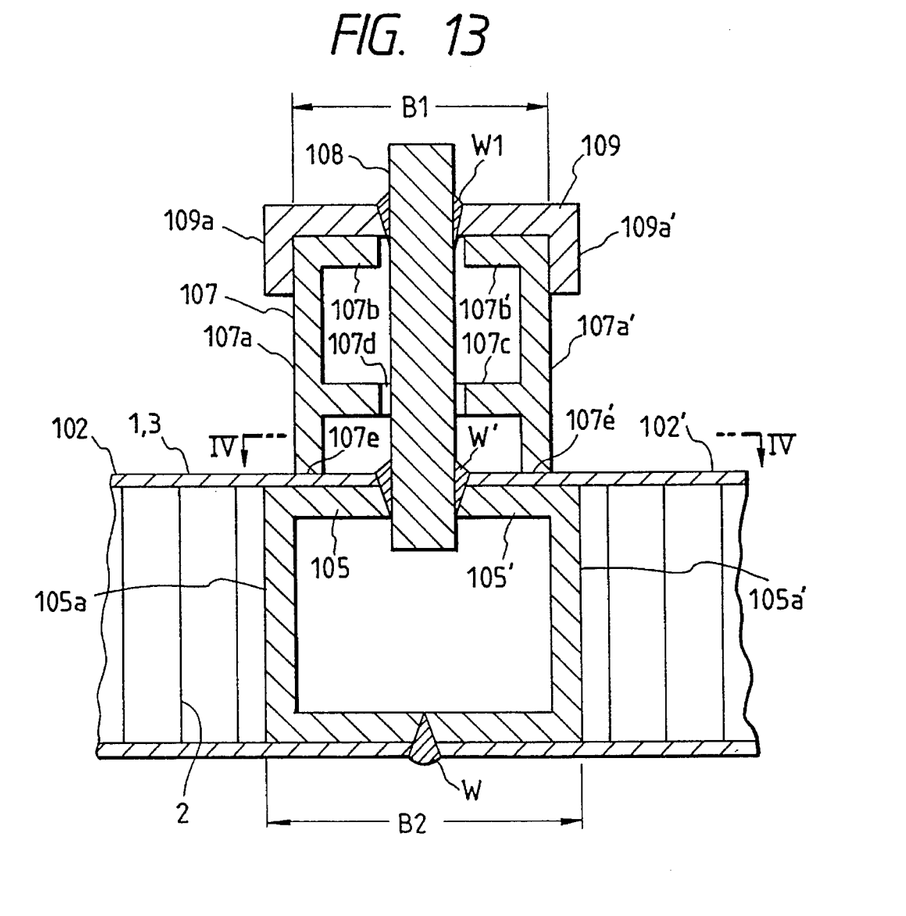
FIG. 13 is a sectional view taken on line III—III in FIG. 12.
Figure 14:
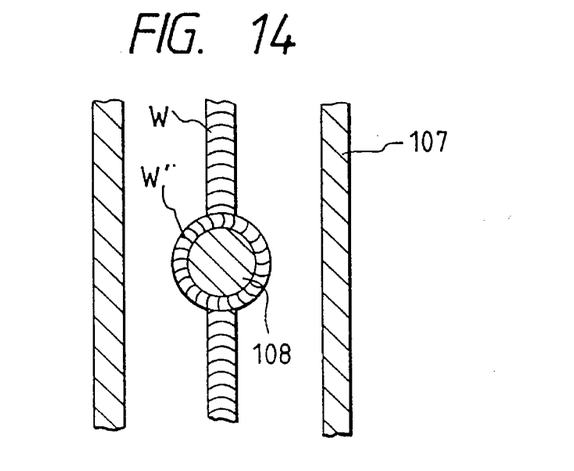
FIG. 14 is a sectional view taken on line IV—IV in FIG. 13.

A rolling stock equipping structure in a further embodiment according to the present invention will be described with reference to FIGS. 11 to 14. FIG. 11 is a sectional front view of a body structure constructed by assembling laminated panels and provided with shapes for interior equipment, FIG. 12 is an enlarged perspective view of a portion II of FIG. 11, FIG. 13 is a sectional view taken on line III—III in FIG. 12, and FIG. 14 is a sectional view taken on line IV—IV in FIG. 13. Shown in the drawings are a body structure 101, laminated panels 102 forming the body structure 101, pairs of face panels 1 and 3 forming the opposite surfaces of the laminated panels 102, cores 2 of the laminated panels 102, channels 105 forming the frames of the laminated panels 102, to be welded to the channels 105 of the adjacent laminated panels 102 when joining together the adjacent laminated panels 102, welds W where the adjacent laminated panels 102 and 102' are joined together, a support frame 107 mounted on the joint of the channels 105 and 105' of the adjacent laminated panels 102 and 102', rods 108 for fastening the support frame 107 to the joint of the adjacent laminated panels 102 and 102', holding plates 109 for pressing the support frame 107 against the laminated panels 102 and 102' to hold the same in place and for suppressing the bending of the opposite side walls 107a of the support frame 107 away from each other, welds W1 joining the rods 108 to the corresponding holding plates 109, and equipment holding members 111 arranged on the support frames 107 to hold interior equipment on the support frame 107.

When building the body structure 101, the channels of the adjacent laminated panels are welded together to form side constructions and a roof construction, and then the side constructions and the roof construction are joined together by welding together the channels 101a and 101a' of the side constructions and the roof construction, as shown in FIG. 11. As shown in FIGS. 11 to 14, the rods 108 are welded to the channels 105 and 105' of the laminated panels 102 and 102' joined together by the welds W of an underframe 101b. The weld W' fixing the rod 108 to the channels 105 and 105' is formed by full-circled welding so that a gap between a hole formed in the channels 105 and 105' of the laminated panels 102 and 102' at the weld W to receive the rod 108 and the rod 108 is fully filled up. The rods 108 are arranged longitudinally of the support frame 107 at intervals of several hundreds millimeters. The support frame 107 is an aluminum alloy extruded member integrally having opposite side walls 107a and 107a', flanges 107b and 107b' projecting toward each other from the upper ends of the side walls 107a and 107a', and a bottom wall 107c interconnecting the side walls 107a and 107a' at a distance above the lower ends of the side wall 107a and 107a'. The width B1 of the support frame 107 is smaller than the width B2 of a beam formed by joining together the channels 105 and 105'. The support frame 107 is cut in a predetermined length, and then through hole 107d are formed in the bottom wall 107c at intervals corresponding to those of the rods 108.

When attaching the support frame 107 to the body structure 101, the support frame 107 is placed on the floor panel with the lower ends 107e and 107e' of the side walls 107a and 107a' mounted on the channels 105 and 105', and with the rods 108 extending through the through holes 107d of the support shape 107, and then the holding plates 109 are attached to the rods 108 to hold the support frame 7 in place. The support frame 107 must be disposed so that the side walls 107a and 107a' thereof are not positioned on the side of the cores 2 relative to the webs 105a and 105a' of the channels 105 and 105'. The side walls 107a and 107a' of the support frame 107 are held between the flanges 109 and 109a' of the holding plates 109 to prevent an increase in the distance between the flanges 107b and 107b' of the side walls 107a and 107a'. The holding plates 109 are welded to the rods 108 by welds W1. To enable the support frame 107 to be replaced with another one, the holding plates 109 may be fastened to the rods 108 with nuts instead of fixing the same to the rods 108 by welds W1. In such a case, the rods 108 are provided with threaded ends and nuts are screwed on the threaded ends of the rods 108 to fasten the support frame 107 with the holding plates 109.

The support frame 107 for supporting various equipment can be fastened to the laminated panels by means of the rods 108 at intervals determined by taking into consideration the equipment supporting strength of the support frame 107. Since the support frame 107 is not welded directly to the channels of the laminated panels, the quantity of welds is comparatively small as compared with that necessary for welding the support frame 107 to the channels of the laminated panels and hence the support frame 107 can be easily arranged on the laminated panels. Furthermore, the influence of attaching the support frame 107 to the laminated panels 102 and 102' on the brazed portions of the face plate 3, the channels 105 and 105' and the cores 2 are reduced. Since the rods 108 are welded to the face plate 3 and the channels 105 and 105' by full-circular welding, no gaps or holes remain in the joints and the reliability in strength of this structure is higher than that formed by using bolts and nuts or rivets. Since the support frame 107 can be placed on the laminated panels without removing burrs in the welded joints exposed on the inner surfaces of the laminated panels, work for removing such burrs is unnecessary and hence the manufacturing cost can be reduced.

Equipment, not shown, to be arranged within the rolling stock is fastened to the support shape 107 with equipment holding members 111, each having a base 111a. The base 111a is inserted in the support frame 107 through the gap between the flanges 107b and 107b' of the support frame 107, and then the equipment holding member 111 is turned so that the base 111a engages the flanges 107b and 107b' so that the equipment holding member 111 will not fall off the support frame 107. The base 111a of the equipment holding member 111 may be attached adhesively to the flanges 107b and 107b' with an adhesive so that the equipment holding member 111 will not be easily dislocated. The equipment holding member 111 may be restrained from turning relative to the support frame 107 by bringing a projection formed on the base 111a into engagement with recesses formed in the flanges 107b and 107b' of the support frame 107.

Figure 15:
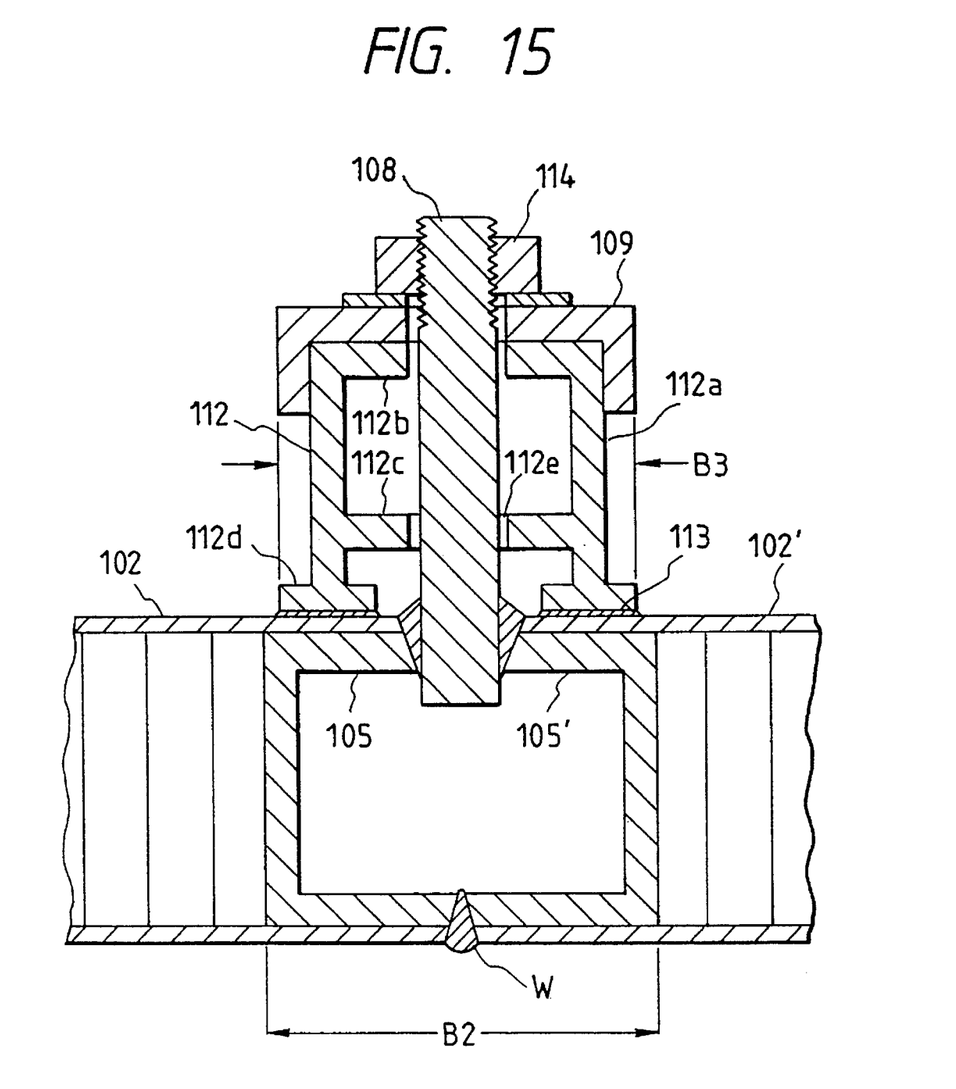
FIG. 15 is a sectional view, similar to FIG. 13, of a rolling stock equipping structure according to the present invention.

A further rolling stock equipping structure according to the present invention will be described hereinafter with reference to FIG. 15. FIG. 15 is a sectional view of a rolling stock equipping structure employing a support shape having opposite side walls provided with foot plates at the lower ends thereof. In FIG. 15, there are shown a support frame 112 for supporting various equipment, adhesive layers 113, and a nut 114. In FIG. 15, parts similar or corresponding to those of FIG. 13 are designated by the same reference characters. The support frame 112 is an aluminum alloy extruded member integrally having opposite side walls 112a provided with foot plates 112d at the lower ends thereof, respectively, flanges 112b respectively projecting toward each other from the upper ends of the side walls 112a, a bottom wall 112c interconnecting the side walls 112a at a distance from the lower ends of the side walls 112a. The maximum width B3 of the support frame 112, namely, the distance between the outer edges of the foot plates 112d, is smaller than the width B2 of a beam formed by joining together the channels 105 and 105'. The support frame 112 is cut in a predetermined length and then through holes 112e are formed in the bottom wall 112c at intervals corresponding to those of the rods 108. When attaching the support frame 112 to the body structure, first one component of a two-part reactive adhesive 113 is spread over the bottom surfaces of the foot plates 112d, and the other component of the two-part reactive adhesive 113 is spread over portions of the face plate corresponding to the channels 105 and 105'. Then, the support frame 112 is placed on the laminated panels with the rods 108 extending through the through holes 112e of the bottom wall 112c so that the foot plates 112d are set on the face plate. The holding plates 109 are fastened to the support frame 112 by screwing the nuts 114 on the rods 108 to press the support frame 112 against the laminated panels so that the components of the two-part reactive adhesive 13 interact with each other to provide a predetermined bonding strength. The position of the support frame 112 is adjusted properly so that the outer ends of the foot plates 112d of the support frame 112 are not positioned on the side of the cores 2 relative to the webs of the channels 105 and 105a'.

Since the support frame 112 is fastened to the laminated panels by screwing the nuts 114 on the rods 108 and by adhesively attaching the foot plates 112 to portions of the laminated panels corresponding to the channels, the load on the rods 108 is reduced and the reliability in strength of the joints between the support frame 112 and the body structure is improved. Since the entire length of the foot plates 112d of the support frame 112 is attached adhesively to the laminated panels, the load on the support frame 112 can be distributed to the laminated panels. Accordingly, the sectional area of the support frame 112 may be smaller than that of the support frame 107 of FIG. 13 to secure the same bending rigidity of the support frame 112 attached to the laminated panels as that of the support frame 107; and, the rolling stock equipping structure having a construction as shown in FIG. 15 can be formed in a lightweight construction.

When a comparatively small load acts on the support frame 112, cushioning members capable of attenuating vibrations may be interposed between the foot plates 112d and the laminated panels to reduce the transmission of vibrations to the equipment supported on the support frame 112, which improves the riding comfort of the rolling stock. The cushioning members interposed between the support frame 112 and the laminated panels avoids direct contact between the support frame and the laminated panels, so that no noise is generated by the vibration of the support frame and the laminated panels relative to each other. The cushioning members are preferably formed of a material softer than that of the support frame or the laminated panels.

Figure 16:
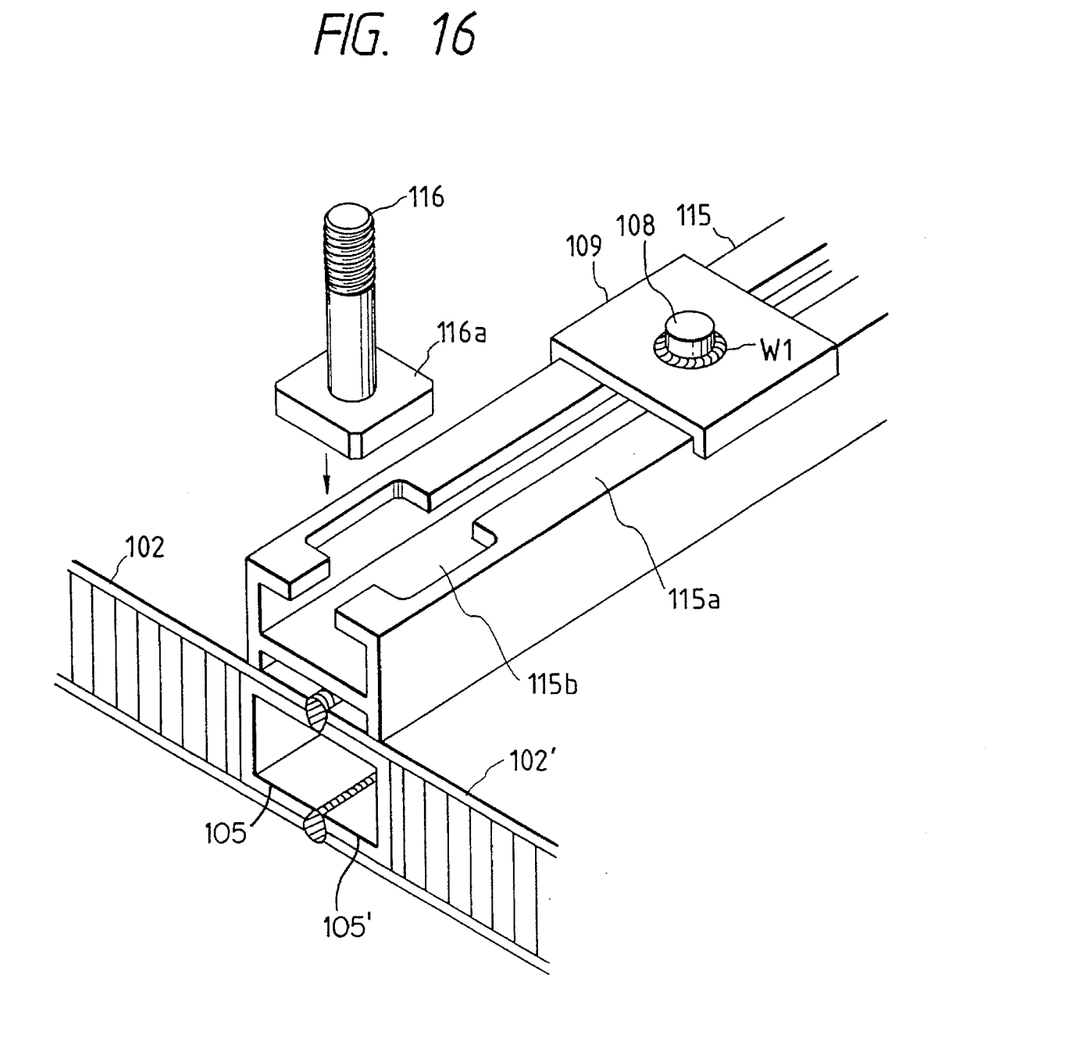
FIG. 16 is a sectional view, similar to FIG. 13, of a rolling stock equipping structure according to the present invention.

An equipment holding member for holding equipment on a rolling stock equipping structure according to another aspect of the present invention will be described with reference to FIG. 16. FIG. 16 is a perspective view of a support frame provided with a hole for receiving equipment holding members to be arranged on the support frame. Referring to FIG. 16, in which parts similar or corresponding to those of the foregoing embodiments are denoted by the same reference characters, there are shown a support frame 115 for holding various equipment, and an equipment holding member 116 for holding equipment on the support frame 115. A receiving hole 115b for receiving the base 116a of the equipment holding member 116 is formed in the flanges 115a of the support frame 115 at an appropriate position. The size of the base 116a of the equipment holding member 116 is determined so that the base 116a is unable to turn in a space formed within the support frame 115. The support frame 115 is placed on the laminated panels 102 and 102' at a position corresponding to the channels 105 and 105', and the support frame 115 is held in place with the holding plates 109. When attaching equipment to the support frame 115, the base 116a of the equipment holding member 116 is inserted through the hole 115b into the support frame 115, the equipment holding member 116 is moved longitudinally of the support frame 115 to a desired position, and then the equipment is fastened to the support frame using the equipment holding member 116. Thus, the equipment holding members 116 can be easily arranged on the support frame 115.

Figure 17:
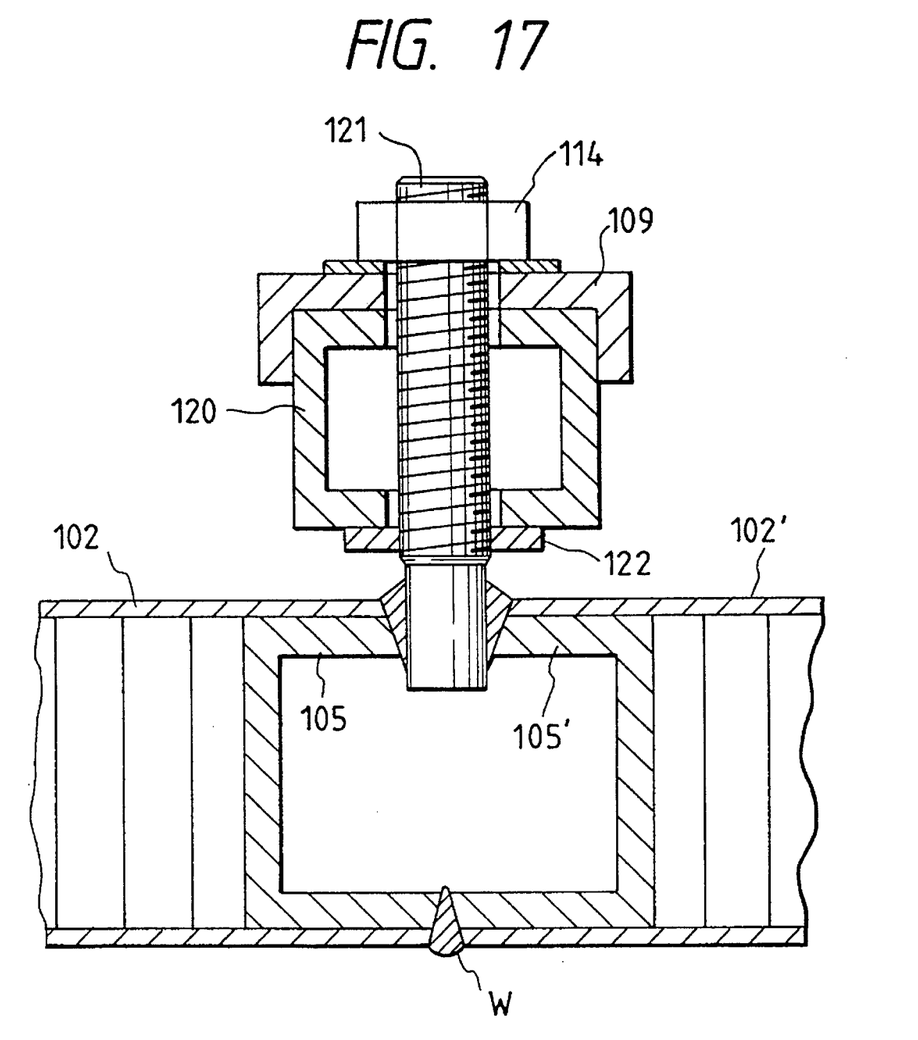
FIG. 17 is a sectional view, similar to FIG. 13, of a rolling stock equipping structure according to the present invention.

A further rolling stock equipping structure according to the present invention will be described with reference to FIG. 17, in which parts similar or corresponding to those of the foregoing embodiments are designated by the same reference characters. FIG. 17 is a sectional view of a rolling stock equipping structure provided with a support frame capable of being moved relative to the laminated panels for positional adjustment. The lower end of a rod 121 is inserted in a hole formed through the weld joining the channels 105 and 105' of the laminated panels 102 and 102' and is welded to the channels 105 and 105'. The rod 121 has a threaded portion for holding a support frame 120, having a diameter greater than that of the lower end thereof. The support frame 120 has a C-shaped cross section and is provided with holes for receiving the rods 121 in its web. An adjusting nut 122 is placed under the web of the support frame 120 to adjust the height the support frame 120 from the surfaces of the laminated panels 102 and 102'. Thus, the support frame 120 is supported on the adjusting nuts 122 and holding plates 109 are pressed against the flanges of the support frame 120 with nuts 114 to hold the support shape 120 on the rods 121.

Thus, the positions of various equipment relative to the body structure can be easily adjusted by adjusting the positions of the adjusting nuts 122 on the rods 121 even if there are small errors in the accuracy of the body structure formed by assembling the laminated panels 102 and 102'. Accordingly, when a unit of equipment is fitted on the body structure, work for adjusting the position of the unit relative to the body structure and for forming holes to be used for fastening the unit to the body structure in both the unit and the body structure is unnecessary; that is, the positions of the plurality of support frames 120 relative to each other can be adjusted in advance by using the adjusting nuts 122. Therefore, it is possible to form equipping holes in the unit of equipment beforehand and to fasten the unit to the support frame 120 attached to the body structure by simple work. The assembling work does not require positional adjustment of the equipment relative to the support frame 120, and so the assembling work can be efficiently carried out even in the narrow space in the body structure.

What is claimed is:

1. A rolling stock having a body structure fitted with a plurality of equipment mounted on inner surfaces of said body structure, said rolling stock comprising:

a plurality of support members for supporting said equipment, said support members extending longitudinally of the body structure parallel to each other and being mounted on the inner surfaces of the body structure;

each support member having a support portion, in which equipment holding means for fixedly holding equipment on the support member is fitted, said support portion extending longitudinally of the body structure;

a plurality of mounting portions for each equipment to be fixed to the equipment holding means of the plurality of support members wherein said equipment holding means engage said mounting portions such that positions of the mounting portions relative to the equipment holding means are adjustable in a longitudinal direction and in directions perpendicular to the longitudinal direction of the body structure;

wherein each equipment is fixed to a plurality of said support members, a first mounting portion of each equipment being fixedly hooked by hook means to one of the support members, and a second mounting portion of each equipment being fixedly screwed by screw means to another of the support members.

2. A rolling stock according to claim 1, wherein the body structure comprises laminated panels each formed by joining together a pair of face plates with a core sandwiched between the pair of face plates, and structural members sandwiched between the face plates and disposed contiguously with the core, and wherein the support members extend on the inner surface of the laminated panel of the body structure at a position corresponding to the location of structural members of said laminated panels.

3. A rolling stock according to claim 2, wherein the structural members of each laminated panel are frame members forming the periphery of the laminated panel, adjacent laminated panels being joined together by welding together the adjacent frame members, and wherein the support member extends along the joint of adjacent frame members of adjacent laminated panels on the inner surface of the laminated panels.

4. A rolling stock according to claim 3, wherein rods are welded to the joint of adjacent frame members of adjacent laminated panels, and the support member is fastened to the rods.

5. A rolling stock according to claim 4, wherein the support member is fastened to the rods so that the distance between the inner surface of the body structure and the support member is adjustable.

6. A rolling stock according to claim 3 or 4, wherein the support member has a C-shaped cross section, and extends in length longitudinally of the body structure.

7. A rolling stock according to claim 2, wherein the support member serves as a structural member of the laminated panel, and the structural member has an opening for receiving equipment holding means therein, and the equipment holding means which are fitted through the opening in the structural member are fixed to the structural member.

8. A rolling stock according to claim 1, wherein one of said equipment comprises a ceiling panel.

9. A rolling stock according to claim 1, wherein said second mounting portion of said equipment includes a slot to enable adjustment of said equipment in the direction perpendicular to the longitudinal direction of the body structure.

* * * * *